(12) United States Patent
Foschini

(10) Patent No.: US 7,349,438 B2
(45) Date of Patent: Mar. 25, 2008

(54) FORMATTER, METHOD OF FORMATTING ENCODED SYMBOLS AND WIRELESS COMMUNICATION SYSTEM EMPLOYING THE SAME

(75) Inventor: Gerard J. Foschini, Sayrerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1144 days.

(21) Appl. No.: 10/245,233

(22) Filed: Sep. 17, 2002

(65) Prior Publication Data

US 2004/0052235 A1 Mar. 18, 2004

(51) Int. Cl.
*H04J 4/00* (2006.01)

(52) U.S. Cl. .................................... 370/478

(58) Field of Classification Search ................ 370/320, 370/335, 342, 441, 479, 349, 206–208, 319, 370/436, 478, 203, 204; 375/267, 346, 261; 455/101
See application file for complete search history.

(56) References Cited

U.S. PATENT DOCUMENTS

| | | | |
|---|---|---|---|
| 6,097,771 A | 8/2000 | Foschini | |
| 6,317,466 B1 | 11/2001 | Foschini et al. | |
| 6,351,499 B1 * | 2/2002 | Paulraj et al. | 375/267 |
| 6,359,923 B1 * | 3/2002 | Agee et al. | 375/130 |
| 7,002,900 B2 * | 2/2006 | Walton et al. | 370/208 |
| 7,095,709 B2 * | 8/2006 | Walton et al. | 370/208 |
| 7,133,459 B2 * | 11/2006 | Onggosanusi et al. | 375/267 |
| 2003/0125040 A1 * | 7/2003 | Walton et al. | 455/454 |
| 2003/0228850 A1 * | 12/2003 | Hwang | 455/101 |

* cited by examiner

*Primary Examiner*—Doris H. To
*Assistant Examiner*—Kerri M Rose

(57) ABSTRACT

The present invention is directed to a formatter, a method of formatting encoded symbols and a wireless communication system employing the same. In one embodiment, the formatter includes a symbol generator that provides a plurality of encoded symbols from a bit stream. The formatter also includes a symbol mapping organizer that maps the plurality of encoded symbols into information cells, each having a unique space coordinate, time coordinate and degree of freedom within a frequency band. The information cells are arranged in a parallelopiped communication resource volume.

10 Claims, 4 Drawing Sheets

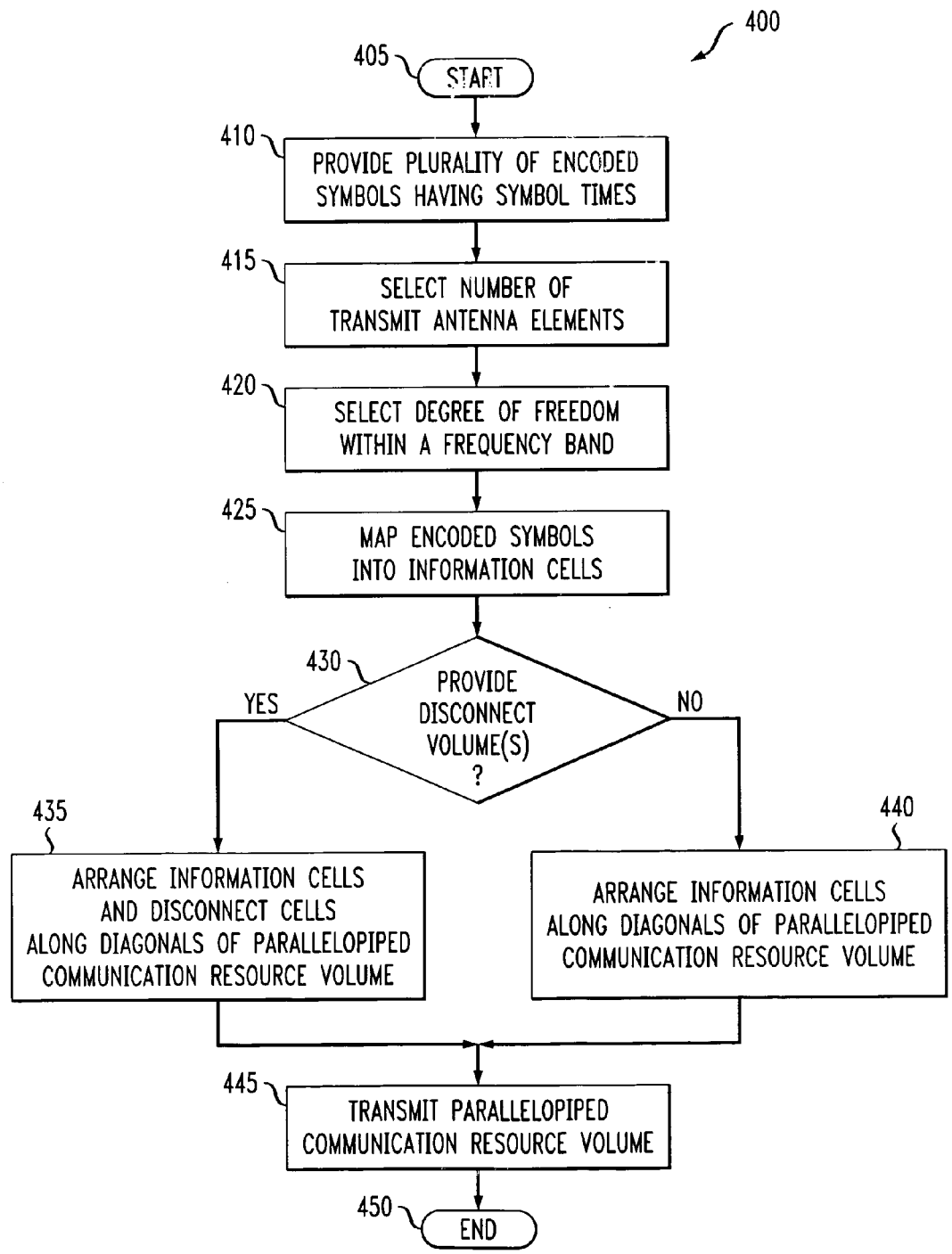

FORMATTER, METHOD OF FORMATTING ENCODED SYMBOLS AND WIRELESS COMMUNICATION SYSTEM EMPLOYING THE SAME

TECHNICAL FIELD OF THE INVENTION

The present invention is directed, in general to wireless communications, and more specifically, to a formatter, a method of formatting encoded symbols and a wireless communication system employing the same.

BACKGROUND OF THE INVENTION

Wireless communication services continue to require higher data rates and lower bit error rates to provide an acceptable quality of service level. It is well known that employing multiple transmit and receive antennas increases the capacity of wireless channels. Transmit and receive diversity schemes represent powerful techniques to combat and mitigate the destructive effects of multi-path fading. A layered architecture, such as Bell Labs Layered Space-Time (BLAST) architecture, may provide high spectral efficiencies at reasonable decoding complexity based on an interference reduction (e.g., nulling) and interference canceling.

A diagonally-layered space-time architecture known as diagonal BLAST or D-BLAST is one such approach. D-BLAST utilizes multi-element antenna arrays at both transmitter and receiver, and an elegant diagonally-layered coding structure in which code blocks are disposed across diagonals in space-time. This processing structure leads to advantageous theoretical Shannon capacities, for instance, that grow linearly with the number of antennas (assuming equal numbers of transmit and receive antennas) wherein these rates may approach 90 percent of Shannon capacity. However, the diagonal space-time approach suffers from certain implementation complexities that tend to make an implementation less practical. For additional information concerning the operation of BLAST and D-BLAST architectures see U.S. Pat. No. 6,097,771, titled "Wireless Communications System having a Layered Space-Time Architecture employing Multi-Element Antennas", and U.S. Pat. No. 6,317,466, titled "Wireless Communications System having a Space-Time Architecture employing Multi-Element Antennas at both the Transmitter and Receiver," which are herein incorporated by reference.

Currently, each antenna element typically uses a single channel code or no channel code, thereby lowering its flexibility. Additionally, detecting and decoding a burst transmission from multi-element antennas may require more detection depth capability to achieve a required quality of service level, due to interference or multi-path reflections, than presently available. In such cases, delivering the bit rate at a desired bit error rate may be difficult even causing a channel outage in some cases.

Accordingly, what is needed in the art is way to provide an enhanced formatting and decision depth capability for wireless communication systems and, preferably, for wireless communication systems subject to burst transmissions employing multi-element antennas.

SUMMARY OF THE INVENTION

To address the above-discussed deficiencies of the prior art, the present invention provides a formatter that includes, in one embodiment, a symbol generator that provides a plurality of encoded symbols from a bit stream. The formatter also includes a symbol mapping organizer that maps the plurality of encoded symbols into information cells, each having a unique space coordinate, time coordinate and degree of freedom within a frequency band. The information cells are arranged in a parallelopiped communication resource volume.

In another aspect, the present invention provides a method of formatting encoded symbols including, in one embodiment, providing a plurality of encoded symbols from a bit stream. The method also includes mapping the plurality of encoded symbols into information cells, each having a unique space coordinate, time coordinate and degree of freedom within a frequency band. The information cells are arranged in a parallelopiped communication resource volume.

In yet another aspect, the present invention provides a wireless communication system that includes a transmitter with a multi-element transmit antenna and having a formatter. The formatter includes a symbol generator that provides a plurality of encoded symbols from a bit stream. The formatter also includes a symbol mapping organizer that maps the plurality of encoded symbols into information cells, each having a unique space coordinate, time coordinate and degree of freedom within a frequency band. The information cells are arranged in a parallelopiped communication resource volume. The formatter still further includes a volume disconnect generator, coupled to the symbol mapping organizer, that provides disconnect cells, each having a unique space coordinate, time coordinate and degree of freedom within a frequency band, proximate the information cells and interspersed within the parallelopiped communication resource volume. The wireless communication system also includes a receiver, having a receive antenna (e.g., a multi-element receive antenna) that receives and decodes the parallelopiped communication resource volume.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 illustrates a flow diagram of an embodiment of a method of formatting encoded symbols constructed in accordance with the principles of the present invention.

DETAILED DESCRIPTION

Figure 1:
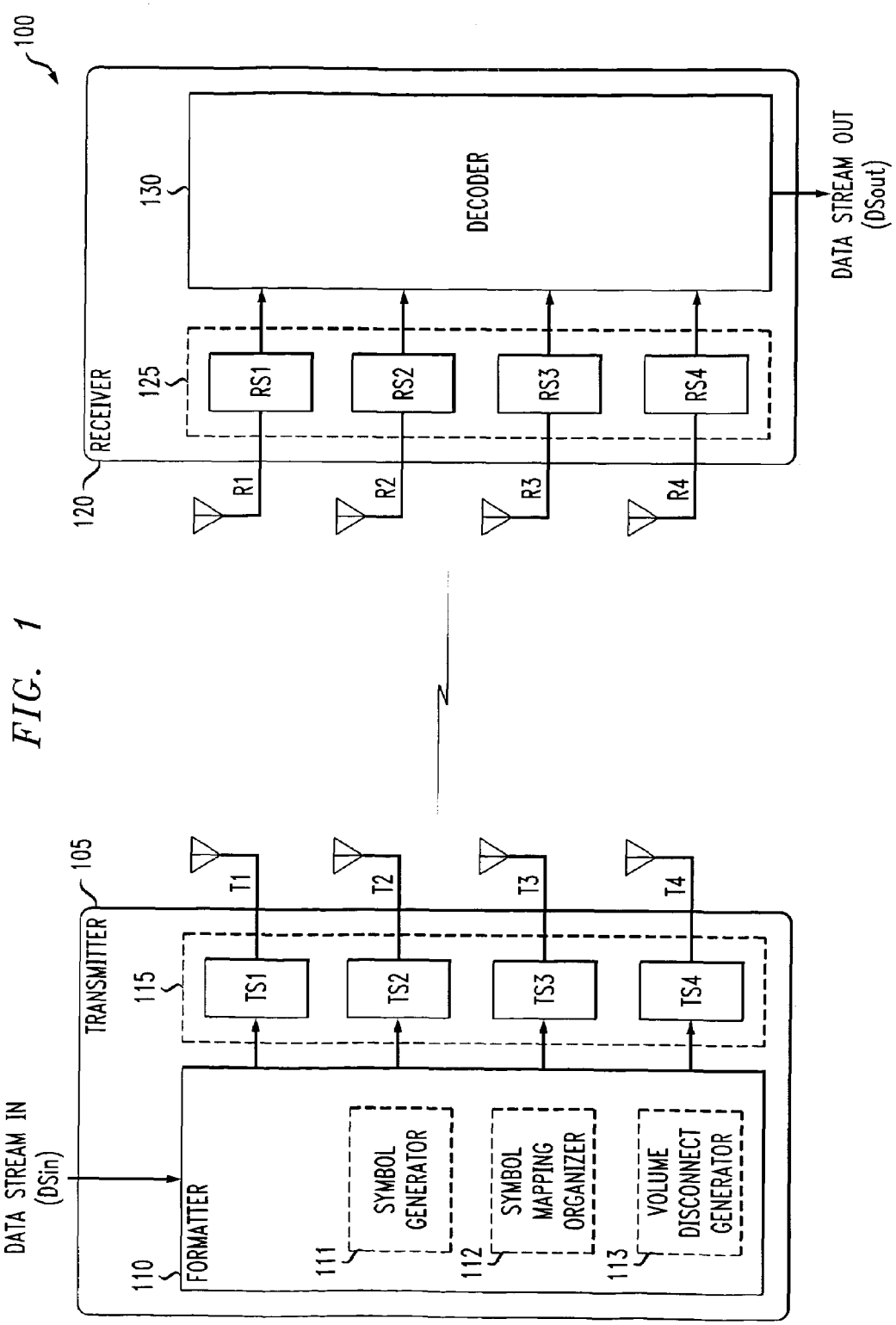
FIG. 1 illustrates a diagram of an embodiment of a wireless communication system constructed in accordance with the principles of the present invention.

Referring initially to FIG. 1, illustrated is a diagram of an embodiment of a wireless communication system, generally designated 100, constructed in accordance with the principles of the present invention. The wireless communication system 100 includes a transmitter 105 that encodes an input data stream DSin and transmits it, using a multi-element transmit antenna, to a receiver 120 that receives the transmission, using a multi-element receive antenna, and decodes it into an output data stream DSout. The transmitter 105 includes a formatter 110 and a transmit sub-system 115 that employs the multi-element transmit antenna having first, second, third and fourth transmit antenna elements T1, T2, T3, T4. The receiver 120 includes a receive sub-system 125 that employs the multi-element receive antenna having first, second, third and fourth receive antenna elements R1, R2, R3, R4 and a receive decoder 130. Of course, those skilled in the art should understand that the receiver 120 may employ a single element receive antenna and still be within the broad scope of the present invention.

In the illustrated embodiment, the input data stream DSin is a primitive bit stream supplied to the transmitter 105 for encoding, formatting and transmission to the receiver 120. The formatter 110 converts the input data stream DSin into a stream of encoded symbols (e.g., a complex representation having amplitude and phase components). The formatter 110 then maps the single stream of encoded symbols into a parallelopiped communication resource volume, which will be further discussed below and with respect to FIGS. 2 and 3. Generally, the parallelopiped communication resource volume represents an advantageous disposition of a group of encoded symbols (representing at least a portion of the input data stream DSin) into a structure for transmission (e.g., burst transmission). This structure allows a decoding in the receiver 120 that provides a robust representation of the input data stream DSin by the decoded output data stream DSout.

The parallelopiped communication resource volume employs first, second, third and fourth sub-volume symbol streams that are respectively associated with the first, second, third and fourth transmit antenna elements T1, T2, T3, T4. First, second, third and fourth transmit sub-channels TS1, TS2, TS3, TS4 are associated with the transmit sub-system 115 and provide necessary conditioning of the four sub-channel symbol streams for transmission. The four transmit sub-channels TS1-TS4 include the frequency tuning, modulation and power amplification circuitry required to condition and transmit each sub-volume symbol stream.

The burst transmission of all four sub-volume symbol streams is received by each of the first, second, third and fourth receive antenna elements R1, R2, R3, R4 associated with the receiver 120. These four receptions are processed by first, second, third and fourth receive sub-channels RS1, RS2, RS3, RS4 associated with the receive sub-system 125 and provided to the receive decoder 130. In the illustrated embodiment, the four receive sub-channels RS1-RS4 include the capture, detection and recovery circuitry to allow processing of the four sub-volume symbol streams into a symbol configuration that may be readily employed by the receive decoder 130. The receive decoder 130 decodes these four inputs into the output data stream DSout that is representative of the input data stream DSin by employing a decoding process based on the structure and attributes of the parallelopiped communication resource volume.

The formatter 110 includes a symbol generator 111, a symbol mapping organizer 112 and a volume disconnect generator 113. As stated earlier, the symbol generator 111 provides a plurality of encoded symbols from a bit stream. The symbol mapping organizer 112 is coupled to the symbol generator 111 and maps the plurality of encoded symbols into information cells that are arranged in the parallelopiped communication resource volume. The information cells have a unique space coordinate, time coordinate and degree of freedom within a frequency band in the parallelopiped communication resource volume. The volume disconnect generator 113 is coupled to the symbol mapping organizer 112 and provides disconnect cells also having a unique space coordinate, time coordinate and degree of freedom within a frequency band that are proximate the information cells.

The space coordinate may be proportional to the number of elements associated with the multi-element antenna employed with the formatter 110, which is four in the illustrated embodiment thereby necessitating the four sub-volume symbol streams. The time coordinate may be proportional to a time associated with the plurality of encoded symbols and is the time associated with each encoded symbol (i.e., a symbol time or duration), in the illustrated embodiment. The degree of freedom within a frequency band may be selected from the group consisting of a Code Division Multiple Access (CDMA) code, a distinct frequency sub-band and a Time Division Multiple Access (TDMA) slot. It should be understood by those skilled in the art that with respect to TDMA applications a refinement of a symbol time or duration would be necessary. As will be discussed with respect to FIGS. 2 and 3, the information and disconnect cells provide an advantageous arrangement forming the parallelopiped communication resource volume that allows both a high data transfer rate and an effective decoding process for use with the burst transmission.

Figure 2:
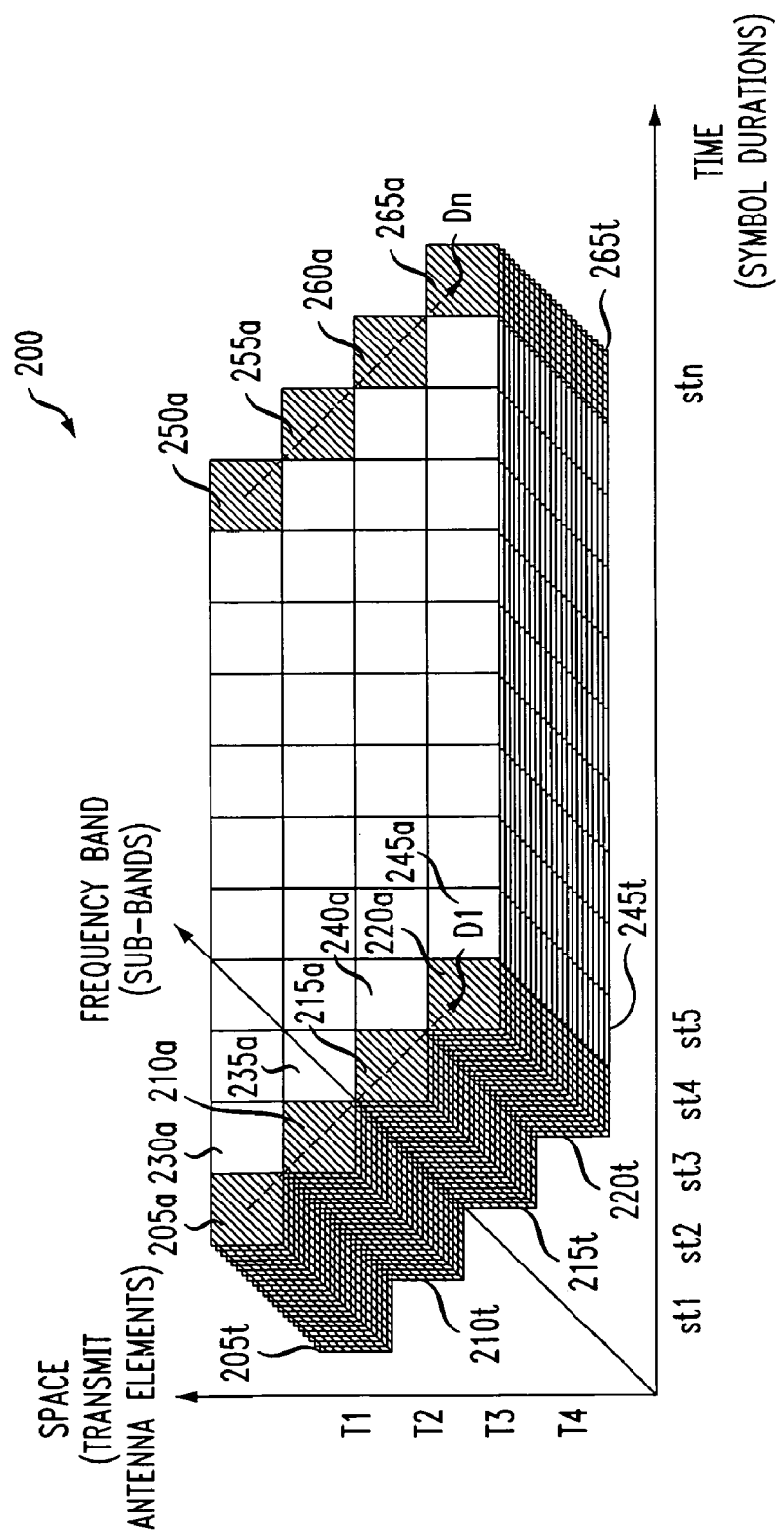
FIG. 2 illustrates a diagram of an embodiment of a parallelopiped communication resource volume constructed in accordance with the principles of the present invention.

Turning now to FIG. 2, illustrated is a diagram of an embodiment of a parallelopiped communication resource volume, generally designated 200, constructed in accordance with the principles of the present invention. The parallelopiped communication resource volume 200 includes a plurality of cells that are arranged in three dimensional coordinates representing space, time and frequency bands. The space coordinate shown represents first, second, third and fourth transmit antenna elements T1, T2, T3, T4. Although four antenna elements are employed in the embodiment of FIG. 2, alternative embodiments may employ any number of transmit antenna elements. The time coordinate shown represents encoded symbol times starting with a first symbol time st1 and progressing to a final symbol time stn. The frequency band shown represents 20 substantially orthogonal frequency sub-bands from sub-band a through sub-band t, thereby allowing 20 cells to be accommodated for each space-time coordinate.

In the illustrated embodiment, all of the cells shown are information cells representing encoded symbols that are to be transmitted. The cells are ordered in the parallelopiped communication resource volume 200 along a diagonal that spans a number of symbol times equal to the number of transmit antenna elements employed (i.e., four symbol times in the illustrated embodiment). This architecture allows high-capacity transmission of the plurality of encoded symbols in a manner that facilitates decoding at a receiver.

Operationally, the first transmit antenna element T1 exclusively and simultaneously transmits its first group of information cells 205a-205t during the first symbol time st1.

Then, the second transmit antenna element T2 simultaneously transmits its first group of information cells 210a-210t during the second symbol time st2, the third transmit antenna element T3 simultaneously transmits its first group of information cells 215a-215t during the third symbol time st3 and the fourth transmit antenna element T4 simultaneously transmits its first group of information cells 220a-220t during the fourth symbol time st4 thereby completing a first diagonal D1 of cells. In similar fashion, a second diagonal of cells is formed employing information cell groups 230a-230t, 235a-235t, 240a-240t and 245a-245t. This process continues until a final diagonal Dn is formed employing information cell groups 250a-250t, 255a-255t, 260a-260t, 265a-265t.

It may be noted from FIG. 2 that the information cells being simultaneously transmitted start at 20 during the first symbol time st1 and increase by 20 during each symbol time until 80 simultaneous information cells are being transmitted. Therefore, by the fourth symbol time st4, the first, second, third and fourth transmit antenna elements T1, T2, T3, T4 are active and 80 information cells are being transmitted during each symbol time. This pattern continues until the end of the parallelopiped communication resource volume 200 wherein the initial process reverses and moves from 80 simultaneous information cells being collectively transmitted to the 20 simultaneous information cells 265a-265t from the transmit antenna element T4 being transmitted during the final symbol time stn.

Information cells along the first and final diagonals D1, Dn may be said to be exposed and provide the basis for effectively decoding the transmission upon reception. The exposed information cells, when addressed collectively, provide an environment of reduced interference that allows decoding of the parallelopiped communication resource volume 200 in an enhanced manner. In the illustrated embodiment, the first and final information cell groups 205a-205t, 265a-265t are exclusive transmissions. Once all of the exposed cell groups have been decoded, they may be effectively removed thereby exposing the next diagonals of information cells for decoding. This process of decoding the exposed information cell groups and then using (e.g., removing) them to decode (e.g., expose) the next diagonal may be employed to effectively decode the entire parallelopiped communication resource volume 200.

In the parallelopiped communication resource volume 200 there are 160 exposed information cells. The number of exposed cells determines a decision depth that allows a given quality of detection to be accomplished in the decoding process. In the discussion above, it was assumed that a decision depth of 160 information cells was adequate to accomplish the desired quality of detection. If this is not the case, additional exposed information cells may be provided in a parallelopiped communication resource volume 200 to accomplish a desired quality of detection.

Figure 3:
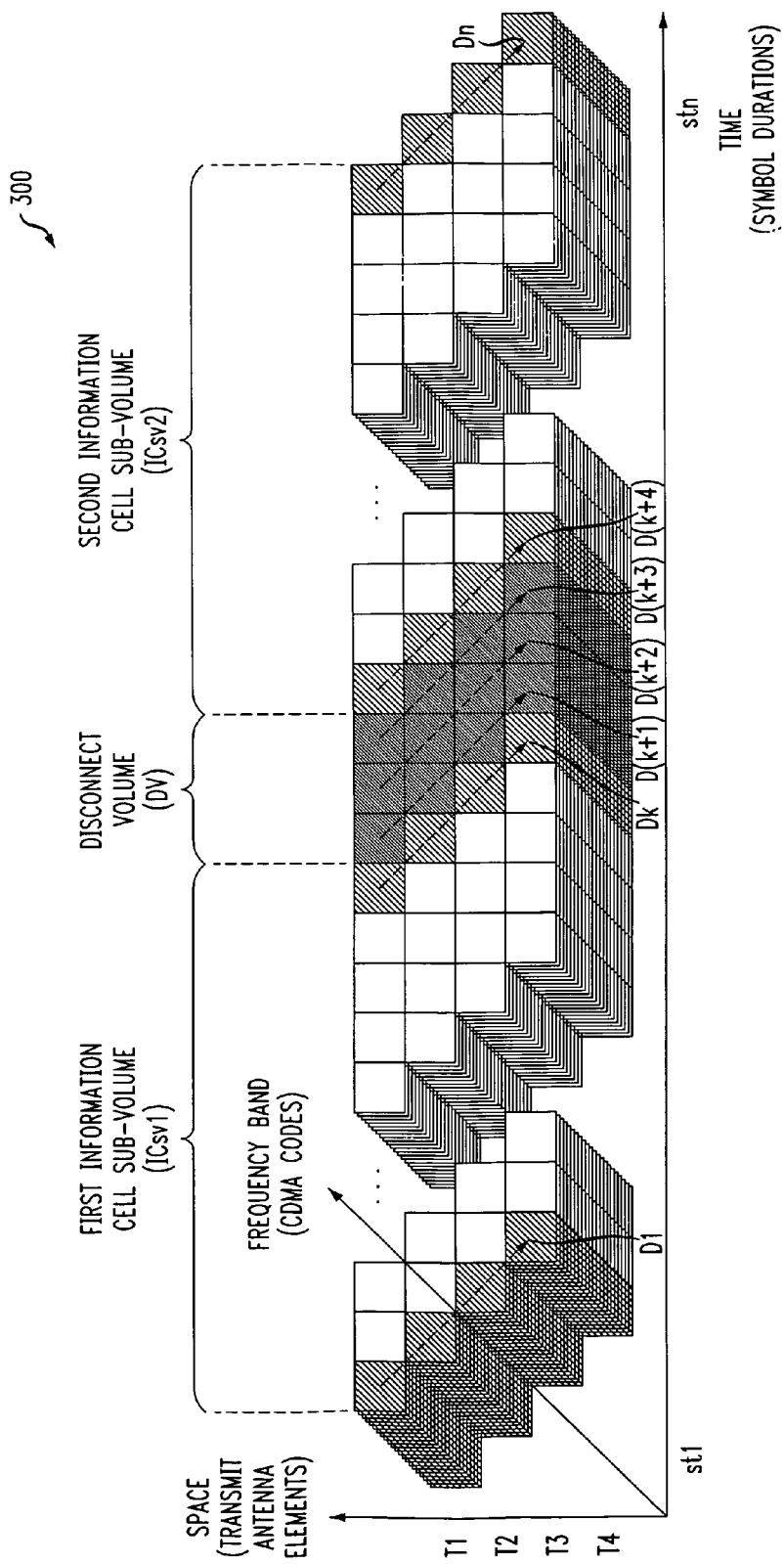
FIG. 3 illustrates a diagram of an embodiment of a parallelopiped communication resource volume containing a disconnect volume constructed in accordance with the principles of the present invention.

Turning now to FIG. 3, illustrated is a diagram of an embodiment of a parallelopiped communication resource volume, generally designated 300, containing a disconnect volume constructed in accordance with the principles of the present invention. The parallelopiped communication resource volume 300 includes a plurality of cells that are arranged in a three dimensional coordinated representing space, time and frequency bands. The space coordinate shown represents first, second, third and fourth transmit antenna elements T1, T2, T3, T4. Again, although four antenna elements are employed in the embodiment of FIG. 2, alternative embodiments may employ any number of transmit antenna elements. The time coordinate shown represents encoded symbol times starting with a first symbol time st1 and progressing to a final symbol time stn. The frequency band shown represents 20 CDMA codes, thereby allowing 20 cells to be accommodated for each space-time coordinate.

The parallelopiped communication resource volume 300 includes first and second information cell sub-volumes ICsv1, ICsv2 and a disconnect volume DV wherein the disconnect volume DV is interspersed between the first and second information cell sub-volumes ICsv1, ICsv2. The first and second information cell sub-volumes ICsv1, ICsv2 contain information cells arranged along a first information diagonal D1 to a first intermediate information diagonal Dk and along a second intermediate information diagonal $D_{(k+4)}$ to a final information diagonal Dn, respectively. In the illustrated embodiment, the disconnect volume DV consists of 240 disconnect cells (12×20 cells) arranged in a contiguous manner along first, second and third disconnect diagonals $D_{(k+1)}$, $D_{(k+2)}$, $D_{(k+3)}$, as shown.

The first and final information diagonals D1, Dn contain information cells that are exposed, as was discussed with respect to FIG. 2. In addition, the first intermediate information diagonal Dk and the second intermediate information diagonal $D_{(k+4)}$ also contain information cells that are exposed thereby increasing the number of exposed information cells from 160 to 320 for the parallelopiped communication resource volume 300. The additional exposed information cells are provided by the disconnect volume DV. This result is accomplished since the disconnect volume DV contains disconnect cells that do not contain information. A disconnect cell may be generated by a transmitter (such as the transmitter 105 in FIG. 1) transmitting known symbols during these cell times.

In the illustrated embodiment, the disconnect volume DV allows a decision depth increase of 100 percent to accommodate detection of codes with longer decision depths. In general, additional interference may be created due to employing more antenna elements, having more transmission path reflectors. The parallelopiped communication resource volume 300 allows the first and second information cell sub-volumes ICsv1, ICsv2 to be decoded either separately or jointly, as may be required. In an alternative embodiment, a parallelopiped communication resource volume may contain a plurality of disconnect volumes thereby allowing as many exposed information cell diagonals as needed to accommodate appropriate detection and decoding.

Turning now to FIG. 4, illustrated is a flow diagram of an embodiment of a method of formatting encoded symbols, generally designated 400, constructed in accordance with the principles of the present invention. The method 400 starts in a step 405 with an intent to encode and format a message for a burst transmission. In a step 410, a plurality of encoded symbols having symbol times, representing a time dimension, are provided from a bit stream. Then, in a step 415, selection of a number of transmit antenna elements representing a space dimension, to be used in the transmission of the plurality of encoded symbols, is accomplished, and a degree of freedom within a frequency band is selected in a step 420.

The number of transmit antenna elements selected in the step 415 is typically any number greater than one, which is the degenerative case. The degree of freedom within a frequency band is selected, in the step 420, from the group consisting of a Code Division Multiple Access (CDMA) code, a distinct frequency sub-band and a Time Division Multiple Access (TDMA) slot. At least one CDMA code, at least one distinct frequency sub-band or at least one TDMA slot is employed within the frequency band of course, any other currently employable or future system or method of creating a degree of freedom within a frequency band is well within the broad scope of the present invention.

In a step 425, the plurality of encoded symbols are mapped into information cells having a unique space coordinate, time coordinate and degree of freedom within a frequency band. In a decision step 430, the need for a disconnect volume is determined. The disconnect volume provides additional decision depth for a detection process employed for the transmission. If one or more disconnect volumes are to be provided, an appropriate number of disconnect cells having a unique space coordinate, time coordinate and degree of freedom within a frequency band are provided.

Then in a step 435, the information cells and the disconnect cells are arranged along appropriate and separate diagonals in a parallelopiped communication resource volume. The disconnect cells are arranged to form at least one contiguous disconnect volume that is proximate the information cells and interspersed within the parallelopiped communication resource volume. If a disconnect volume is not provided in the decision step 430, the information cells provided in the step 425 are arranged along appropriate diagonals within a parallelopiped communication resource volume in a step 440. The parallelopiped communication resource volume from the step 435 or the step 440 is transmitted in the step 445. The method 400 ends in a step 450.

In summary, embodiments of the present invention illustrating a formatter and a method of formatting encoded symbols that are employable with a wireless communication system have been presented. The formatter includes a symbol generator that provides a plurality of encoded symbols, and a symbol mapping organizer that maps the plurality of encoded symbols into information cells that have a unique space coordinate, time coordinate and degree of freedom within a frequency band.

The formatter may also include a disconnect volume generator that provides disconnect cells having a unique space coordinate, time coordinate and degree of freedom within a frequency band. The information cells and proximate disconnect cells are arranged along appropriate and separate diagonals in a parallelopiped communication resource volume. The information and disconnect cells provide an advantageous diagonal arrangement forming the parallelopiped communication resource volume that allows both a high data transfer rate and an effective decoding process for use with the burst transmission.

For a better understanding of communication systems and networks in general, see "Wireless Communications, Principles and Practice," by Theodore S. Rappaport, Prentice Hall PTR, 1996, "Microwave Mobile Communications," edited by William C. Jakes, IEEE Communications Society, 1993, and "Digital Communications," $3^{rd}$ Edition, by John C. Proakis, McGraw-Hill, Inc., 1995, all of which are herein incorporated by reference in their entirety.

Although the present invention has been described in detail, those skilled in the art should understand that they can make various changes, substitutions and alterations herein without departing from the spirit and scope of the invention in its broadest form.

What is claimed is:

1. An apparatus, comprising:
  a transmitter including a formatter and an array of transmit antenna elements coupled to receive symbols from the formatter,
  wherein the formatter has:
    a symbol generator configured to encode a bit stream into a stream of the symbols; and
    a symbol mapping organizer configured to separate the stream of symbols into sequences of cells such that each sequence contains an equal number of cells, each symbol is in only one of the cells, and each cell has one or more of the symbols, and wherein each cell in the sequence of cells identifies an associated degree of freedom within a frequency band, the symbol mapping organizer being configured to send each sequence to a corresponding one of the transmit antenna elements for transmission such that the different antenna elements transmit their corresponding sequences in a staggered manner, the transmissions of different sequences being staggered by the same time interval.

2. The apparatus as recited in claim 1 further comprising a volume disconnect generator, coupled to the symbol mapping organizer, configured to provide disconnect cells proximate the cells in the sequence.

3. The apparatus as recited in claim 2 wherein the disconnect cells are configured to be interspersed within the cells in the sequence.

4. The apparatus as recited in claim 2 wherein the disconnect cells are configured to be arranged contiguously in the sequence.

5. The apparatus as recited in claim 1 wherein the degree of freedom within a frequency band is selected from the group consisting of:
  a Code Division Multiple Access (CDMA) code,
  a distinct frequency sub-band, and
  a Time Division Multiple Access (TDMA) slot.

6. A method, comprising:
  receiving symbols for transmission from a formatter; and
  transmitting the symbols with an array of transmit antenna elements,
  wherein formatting in the formatter comprises:
    providing a stream of encoded symbols from a bit stream;
    separating the stream of encoded symbols into sequences of cells such that each sequence contains an equal number of cells, each symbol is in only one of the cells, and each cell has one or more of the symbols and wherein each cell in the sequence of cells identifies and associated degree of freedom within a frequency band; and
    sending each sequence to a corresponding one of the transmit antenna elements for transmission such that the different antenna elements transmit their corresponding sequences in a staggered manner, the transmissions of different sequences being staggered by the same time interval.

7. The method as recited in claim 6 further comprising providing disconnect cells proximate to the cells in the sequence.

8. The method as recited in claim 7 wherein the disconnect cells are interspersed within the cells of the sequence.

9. The method as recited in claim 7 wherein the disconnect cells are arranged contiguously in the sequence.

10. The method as recited in claim 6 wherein the degree of freedom within a frequency band is selected from the group consisting of:
  a Code Division Multiple Access (CDMA) code,
  a distinct frequency sub-band, and
  a Time Division Multiple Access (TDMA) slot.

* * * * *